United States Patent Office 3,055,913
Patented Sept. 25, 1962

3,055,913
NOVEL FLUORINATED COMPOUNDS
Leonard O. Moore, and Jared W. Clark, Charleston, W. Va., assignors to Union Carbide Corporation, a corporation of New York
No Drawing. Filed Nov. 1, 1960, Ser. No. 66,426
4 Claims. (Cl. 260—327)

This invention relates to novel organic compounds containing six fluorine atoms and the method of preparing them.

More particularly, this invention relates to the novel fluorinated compounds, perfluorobiacetyl and 2,3-dichloro-1,1,1,4,4,4-hexafluoro-2,3,-butanediol sulfate, and the method of preparing them.

The novel compounds of this invention are produced by the oxidation of 2,3-dichloro-1,1,1,4,4,4-hexafluoro-2-butene.

The reaction can be illustrated by the following equation:

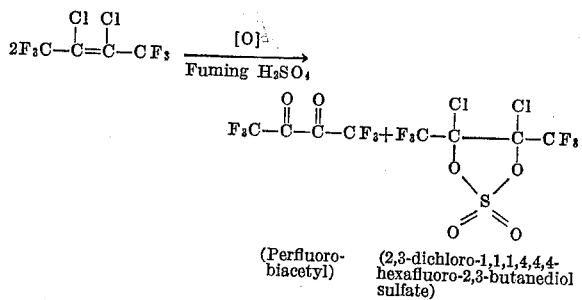

| (Perfluoro- biacetyl) | (2,3-dichloro-1,1,1,4,4,4- hexafluoro-2,3-butanediol sulfate) |

The oxidizing agents which are operable in the above reaction are chromium trioxide and potassium chlorate in fuming sulfuric acid. The preferred oxidizing agent is chromium trioxide in fuming sulfuric acid.

The proportion of the substituted butene to the oxidizing agent is not narrowly critical. The preferred range is from 1 to 3 parts by weight of the butene to one part of oxidizing agent. The particularly preferred range is from 1.5 to 2.5 parts of the substituted butene to one part of the oxidizing agent.

The proportion of fuming sulfuric acid to the substituted butene is also not critical. Ranges such as 1:1 and lower to 30:1 and higher are operable. The preferred range is 3:1 to 10:1.

The temperature at which the reaction is carried out is also not narrowly critical and temperatures within the range of about 0 and lower to 150° C. and higher are operable.

The reaction will proceed as at atmospheric, subatmospheric and superatmospheric pressures. The preferred pressure is atmospheric pressure.

The novel compounds of this invention are useful as bacteriostats and fungicides as well as chemical intermediates for the synthesis of biologically active chemicals. Perfluorobiacetyl is also useful in treating textiles such as cotton to impart wash and wear characteristics thereto. Additionally, the novel cyclic sulfate can be converted to perfluorobiacetyl by hydrolysis.

The following example illustrates the invention.

*Example 1*

55 grams (0.55 mol) of chromium trioxide in 448 grams of 20 percent fuming sulfuric acid at 35° C. was placed in a reaction vessel and 116 grams (0.5 mol) of 2,3-dichloro-1,1,1,4,4,4-hexafluoro-2-butene was added. After standing overnight, the mixture was stirred with a nitrogen purge. The 88 grams of yellow condensate in the Dry-Ice acetone cooled traps were distilled to yield 11.0 grams (31 percent) of chlorine, B.P. $-33$ to $-30°$ C., at 760 mm. Hg, 13.0 grams (10 percent) of trifluoroacetyl chloride, B.P. $-20$ to $-15°$ C. at 760 mm. Hg and 29.0 grams (30 percent) of yellow perfluorobiacetyl, B.P. 18 to 20° C. at 760 mm. Hg, M.P. $-30$ to $-29°$ C.

Dilution of the reaction mixture with 225 cc. of water followed by ether extraction separated 41 grams (30 percent) of an oil. Distillation gave 2,3-dichloro-1,1,1,4,4,4-hexafluoro-2,3-butanediol sulfate, B.P. 67 to 69° C./50 mm., of Hg, n 20/D 1.3735.

What is claimed is:

1. The process of reacting 2,3-dichloro-1,1,1,4,4,4-hexafluoro-2-butene with a mixture of fuming sulfuric acid and an oxidant selected from the class consisting of potassium chlorate and chromium trioxide at a temperature of from 0 to 150° C.

2. The process of claim 1 wherein the ratio of the substituted butene to the oxidant is from 1:1 to 3:1 by weight.

3. 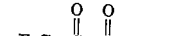

4. 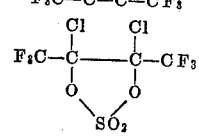

References Cited in the file of this patent

Jackson et al.: Jour. Amer. Chem. Soc., vol 57, pp. 2522–36 (1915).